(12) United States Patent
Itoga et al.

(10) Patent No.: US 8,396,646 B2
(45) Date of Patent: Mar. 12, 2013

(54) INTERNAL EGR CONTROL DEVICE FOR INTERNAL COMBUSTION ENGINE

(75) Inventors: Chiho Itoga, Saitama-ken (JP); Ken Ogawa, Saitama-ken (JP); Toru Kitamura, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 298 days.

(21) Appl. No.: 12/933,557

(22) PCT Filed: Feb. 17, 2009

(86) PCT No.: PCT/JP2009/052676
§ 371 (c)(1),
(2), (4) Date: Sep. 20, 2010

(87) PCT Pub. No.: WO2009/122794
PCT Pub. Date: Oct. 8, 2009

(65) Prior Publication Data
US 2011/0017157 A1    Jan. 27, 2011

(30) Foreign Application Priority Data
Apr. 2, 2008  (JP) .................................. 2008-095888

(51) Int. Cl.
*F02B 47/08* (2006.01)
*F02M 25/07* (2006.01)
(52) U.S. Cl. ................. 701/108; 123/568.14; 123/90.15
(58) Field of Classification Search ............... 123/90.15, 123/90.16, 90.17, 568.14; 701/108, 109
See application file for complete search history.

(56) References Cited

U.S. PATENT DOCUMENTS

| 7,181,332 B1 | 2/2007 | Vick et al. |
| 2002/0112692 A1 | 8/2002 | Abo et al. |
| 2004/0230364 A1 | 11/2004 | Uchida et al. |
| 2008/0092862 A1 | 4/2008 | Kitamura et al. |

FOREIGN PATENT DOCUMENTS

| DE | 102 13 138 A1 | 5/2003 |
| DE | 10 2005 055 952 A1 | 5/2007 |

(Continued)

OTHER PUBLICATIONS

Machine translation on Aug. 23, 2012 of Japanese Patent JP 2003-49758, Masahito, Ebara. Document named: 12933557_20120823_JP_2003-049758_machinetranslation.pdf.*

*Primary Examiner* — Stephen K Cronin
*Assistant Examiner* — Carl Staubach
(74) *Attorney, Agent, or Firm* — Arent Fox LLP

(57) ABSTRACT

There is provided an internal EGR control device for an internal combustion engine, which, even when a change in the actual valve timing of exhaust valves is caused by aging, is capable of properly controlling an internal EGR amount while compensating for an adverse influence caused by the change, and thereby properly controlling the temperature within the cylinder. The internal EGR control device 1 sets a target internal EGR amount EGRINCMD which serves a target of the internal EGR amount, according to detected operating conditions, NE and PMCMD, of the engine 3, and calculates internal energy QACT possessed by burned gases, which is determined according to the amount and temperature of the burned gases. Further, the target internal EGR amount EGRINCMD is corrected according to the calculated internal energy, and the valve-closing timing of the exhaust valve 9 is calculated according to the corrected internal EGR amount EGRIN. Further, the variable valve mechanism 60 is controlled based on the calculated valve-closing timing of the exhaust valve 9.

2 Claims, 9 Drawing Sheets

FOREIGN PATENT DOCUMENTS

| | | |
|---|---|---|
| EP | 1234965 A2 | 8/2002 |
| EP | 1452708 B1 | 7/2006 |
| EP | 1 770 265 A2 | 4/2007 |
| EP | 1918552 A1 | 5/2008 |
| JP | 62-010411 A | 1/1987 |
| JP | 2002-242716 A | 8/2002 |
| JP | 2003-49758 * | 2/2003 |
| JP | 2003-049758 A | 2/2003 |
| JP | 2003-184588 A | 7/2003 |
| JP | 2004-251183 A | 9/2004 |
| JP | 2007-100526 A | 4/2007 |
| JP | 2007-205181 A | 8/2007 |
| JP | 2007-255205 A | 10/2007 |
| JP | 2008-106654 A | 5/2008 |

* cited by examiner

INTERNAL EGR CONTROL DEVICE FOR INTERNAL COMBUSTION ENGINE

FIELD OF THE INVENTION

The present invention relates to an internal EGR control device for an internal combustion engine, for controlling internal EGR which causes burned gases to remain in cylinders.

BACKGROUND ART

Conventionally, there has been proposed an internal EGR control device of this kind in Patent Literature 1. In this internal EGR control device, the amount of internal EGR caused to remain in cylinders is controlled by changing an intake cam phase and an exhaust cam phase with respect to a crankshaft by a variable intake cam phase mechanism and a variable exhaust cam phase mechanism, respectively, and by changing the lift of an intake valve by a variable intake lift mechanism. Specifically, the opening and closing timing of intake and exhaust valves is controlled by controlling the above-mentioned variable intake/exhaust cam phase mechanisms and the variable intake lift mechanism depending on operating conditions of the engine which are determined e.g. according to the rotational speed of the engine and the opening of a throttle valve.

As described above, in the conventional internal EGR control device, the internal EGR amount is controlled only by controlling the opening and closing timing of the intake and exhaust valves depending on the operating conditions, such as a rotational speed and a throttle valve opening, of the engine. However, even when the operating conditions of the engine are the same, if the actual opening and closing timing of the intake and exhaust valves or the like varies due to aging, a state and properties of burned gases, e.g. the amount and temperature of burned gases change, and accordingly, the temperature within each cylinder immediately before the start of the compression stroke also changes. This sometimes makes it impossible for a conventional internal EGR control device to properly control the temperature within the cylinder, and in this case, the state of combustion becomes unstable.

The present invention has been made to provide a solution to the above-described problems, and an object thereof is to provide an internal EGR control device for an internal combustion engine, which, even when a change in the actual valve timing of exhaust valves is caused by aging, is capable of properly controlling an internal EGR amount while compensating for an adverse influence caused by the change, and thereby properly controlling the temperature within the cylinder.

[Patent Literature 1]
Japanese Laid-Open Patent Publication (Kokai) No. S62-10411

DISCLOSURE OF THE INVENTION

To attain the object, the invention as claimed in claim 1 provides an internal EGR control device 1 for an internal combustion engine 3 for controlling internal EGR which causes burned gases to remain in a cylinder 3a, comprising a variable valve mechanism (exhaust-side valve-operating mechanism 60 in the embodiments (the same applies hereinafter in this section)) that controls an internal EGR amount by changing a vale-closing timing of an exhaust valve 9 of the engine 3, operating condition-detecting means (crank angle sensor 21, accelerator pedal opening sensor 31) for detecting operating conditions (engine speed NE, demanded torque PMCMD) of the engine 3, target internal EGR amount-setting means (ECU 2, step 11 in FIG. 9) for setting a target internal EGR amount EGRINCMD which serves as a target to which the internal EGR amount is controlled, according to the detected operating conditions of the engine 3, internal energy-calculating means (ECU 2, step 12 in FIG. 9) for calculating internal energy (actual internal energy QACT) possessed by burned gases, which is determined according to an amount and temperature of the burned gases, target internal EGR amount-correcting means (ECU 2, step 15 in FIG. 9) for correcting the target internal EGR amount EGRINCMD according to the calculated internal energy, valve-closing timing-calculating means (ECU 2, steps 16, 19 in FIG. 9) for calculating the valve-closing timing of the exhaust valve 9 according to the corrected target internal EGR amount (final target internal EGR amount EGRINC), and control means (ECU 2, steps 17, 18, 20 to 22 in FIG. 9) for controlling the variable valve mechanism based on the calculated valve-closing timing of the exhaust valve 9.

According to this internal EGR control device for an internal combustion engine, the internal EGR which causes burned gasses to remain in the cylinders is controlled by changing the valve-closing timing of the exhaust valve using the variable valve mechanism. Further, a target internal EGR amount which serves as a target to which the internal EGR amount is controlled is set according to the detected operating conditions of the engine. Further, the internal energy possessed by the burned gases is calculated. The internal energy is determined according to the amount and temperature of burned gases. Therefore, even when aging has caused a change in the actual valve timing of exhaust valves, thereby causing a change in the state and properties of burned gases, by correcting the target internal EGR amount according to the calculated internal energy, it is possible to properly control the internal EGR amount while compensating for an adverse influence caused by the change.

Further, in the present invention, the valve-closing timing of the exhaust valve is calculated according to the target internal EGR amount which is corrected as above, and the variable valve mechanism is controlled based on the valve-closing timing. Therefore, it is possible to properly control the internal EGR amount. As a result, it is possible to properly control the temperature within the cylinder.

The invention as claimed in claim 2 is the internal EGR control device 1 for an internal combustion engine 3 as claimed in claim 1 wherein the variable valve mechanism comprises a variable lift mechanism (variable exhaust lift mechanism 70) for changing a lift of the exhaust valve 9, and a variable cam phase mechanism (variable exhaust cam phase mechanism 90) for changing an exhaust cam phase CAEX which is a phase with respect to a crank shaft 3e of an exhaust cam 62 which drives the exhaust valve 9.

BEST MODE FOR CARRYING OUT THE INVENTION

Figure 1:
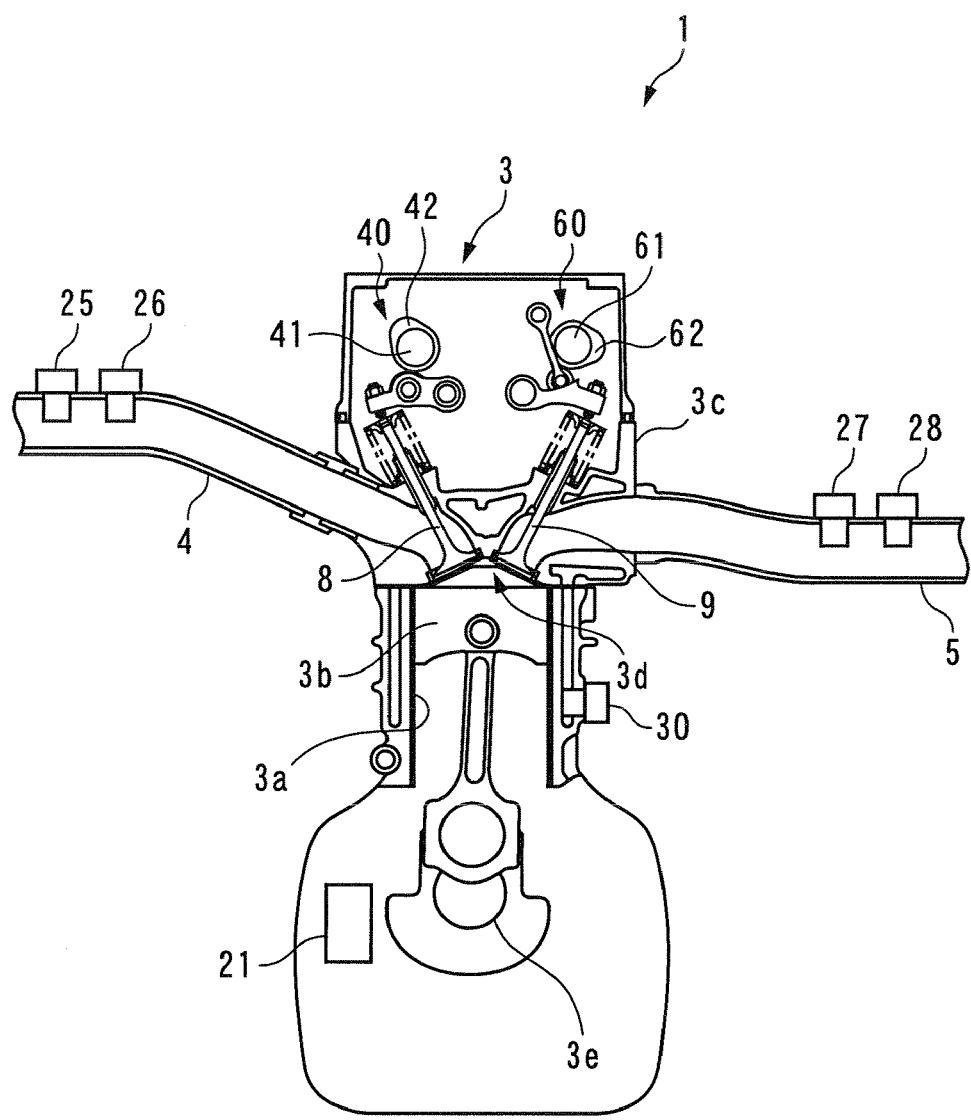
FIG. 1 A schematic view of an internal EGR control device according to the present invention and an internal combustion engine incorporating the same.

The invention will now be described in detail with reference to the drawings showing preferred embodiment thereof. FIG. 1 schematically shows the arrangement of an internal EGR control device 1 according to an embodiment of the present invention and an internal combustion engine 3 (hereinafter simply referred to as the "engine") to which the present invention is applied. The engine 3 is a gasoline engine that has four cylinders 3a (only one of which is shown), and is installed on a vehicle, not shown.

The engine 3 has a cylinder head 3c having an intake pipe 4 and an exhaust pipe 5 connected thereto, and a fuel injection valve 6 and an ignition plug 7 (see FIG. 2) mounted therethrough such that they face a combustion chamber 3d (only one of each of which is shown), for each cylinder 3a thereof. The fuel injection valve 6 is configured to directly inject fuel to the vicinity of the ignition plug 7 in the combustion chamber 3d. The fuel injection amount and fuel injection timing of the fuel injection valve 6 are controlled by controlling the valve-opening time period and the valve-opening timing thereof by an ECU 2 (see FIG. 2). The ignition timing of the spark plug 7 is also controlled by the ECU 2. Further, the engine 3 has a homogeneous combustion mode (hereinafter referred to as the "SI combustion mode") in which a homogeneous air-fuel mixture generated by injecting fuel from the fuel injection valve 6 during the suction stroke is burned by spark ignition by the ignition plug 7, and a stratified combustion mode (hereinafter referred to as the "CI combustion mode") in which a stratified air-fuel mixture generated by injecting fuel from the fuel injection valve 6 during the compression stroke is burned by self-ignition, and the switching of the combustion mode therebetween is controlled by the ECU 2.

Further, each cylinder 3a has a pair of intake valves 8 and 8 (only one of which is shown), and a pair of exhaust valves 9 and 9 (only one of which is shown) disposed therein. The intake valves 8 and 8 are opened and closed by an intake-side valve-operating mechanism 40, and the exhaust valves 9 and 9 are opened and closed by an exhaust-side valve-operating mechanism 60. A description will be given of the intake-side valve-operating mechanism 40 and the exhaust-side valve-operating mechanism 60 with reference to FIGS. 3 to 6.

Figure 3:
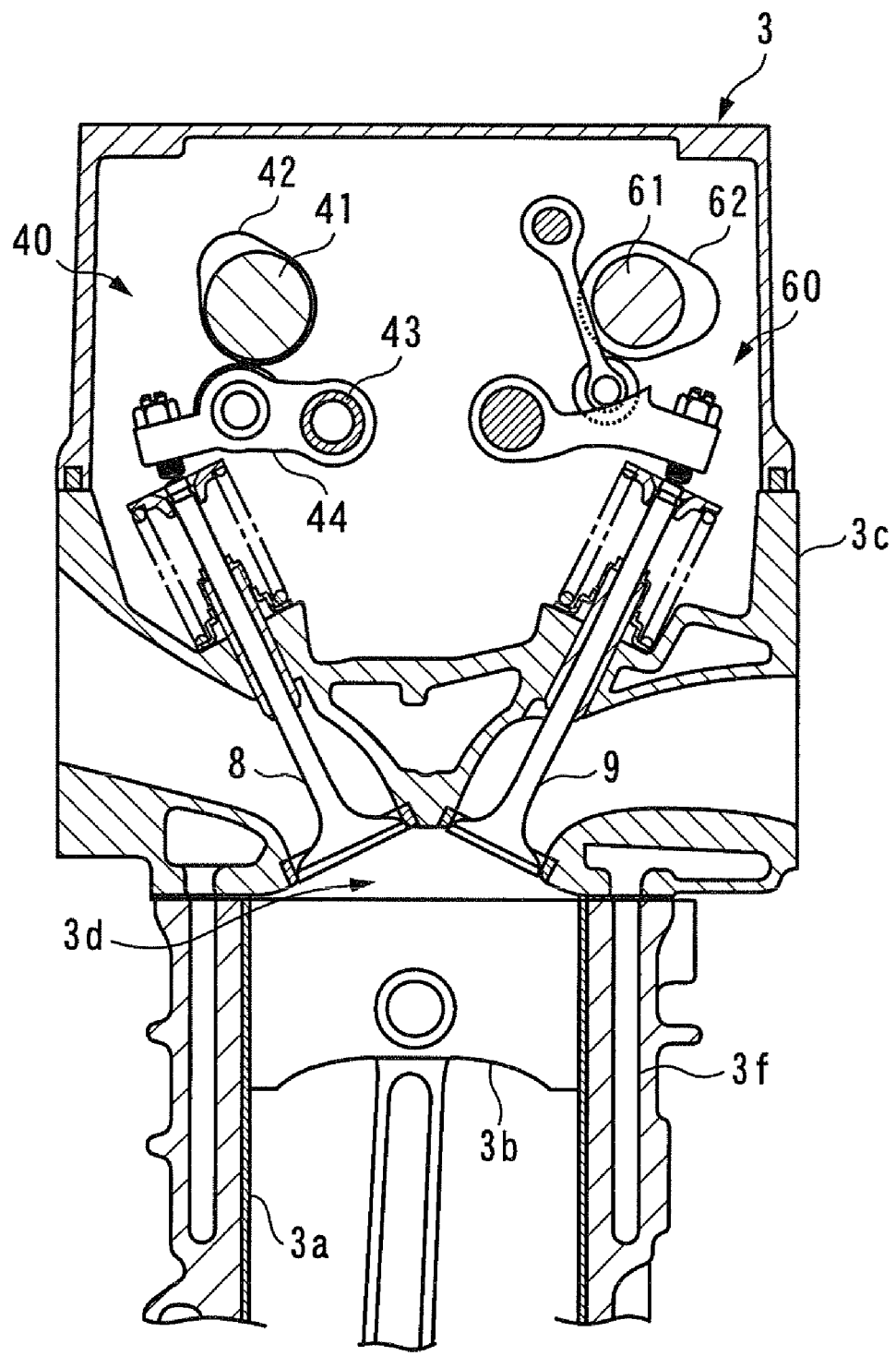
FIG. 3 A partial enlarged view of FIG. 1.

The intake-side valve-operating mechanism 40 is of an ordinary cam driven type, and as shown in FIG. 3, is comprised of a rotatable intake cam shaft 41, an intake cam 42 integrally formed with the intake cam shaft 41, a rocker arm shaft 43, and two rocker arms 44 and 44 (only one of which is shown) which are pivotally supported by the rocker arm shaft 43 for being brought into abutment with respective top ends of the intake valves 8 and 8.

The intake cam shaft 41 is connected to a crankshaft 3e via an intake sprocket and a timing chain (neither of which is shown), and rotates once whenever the crankshaft 3e rotates twice. As the intake cam shaft 41 is rotated, the rocker arms 44 and 44 are pressed by the intake cam 42 to be pivoted about the rocker arm shaft 43, whereby the intake valves 8 and 8 are opened and closed.

On the other hand, the exhaust-side valve-operating mechanism 60 is formed by a variable valve mechanism which steplessly changes the lift and valve timing of the exhaust valves 9. It should be noted that in the present embodiment, the phrase "the lift of the exhaust valves 9 (hereinafter referred to as the "exhaust lift")" is intended to mean the maximum lift of the exhaust valves 9.

Figure 4:
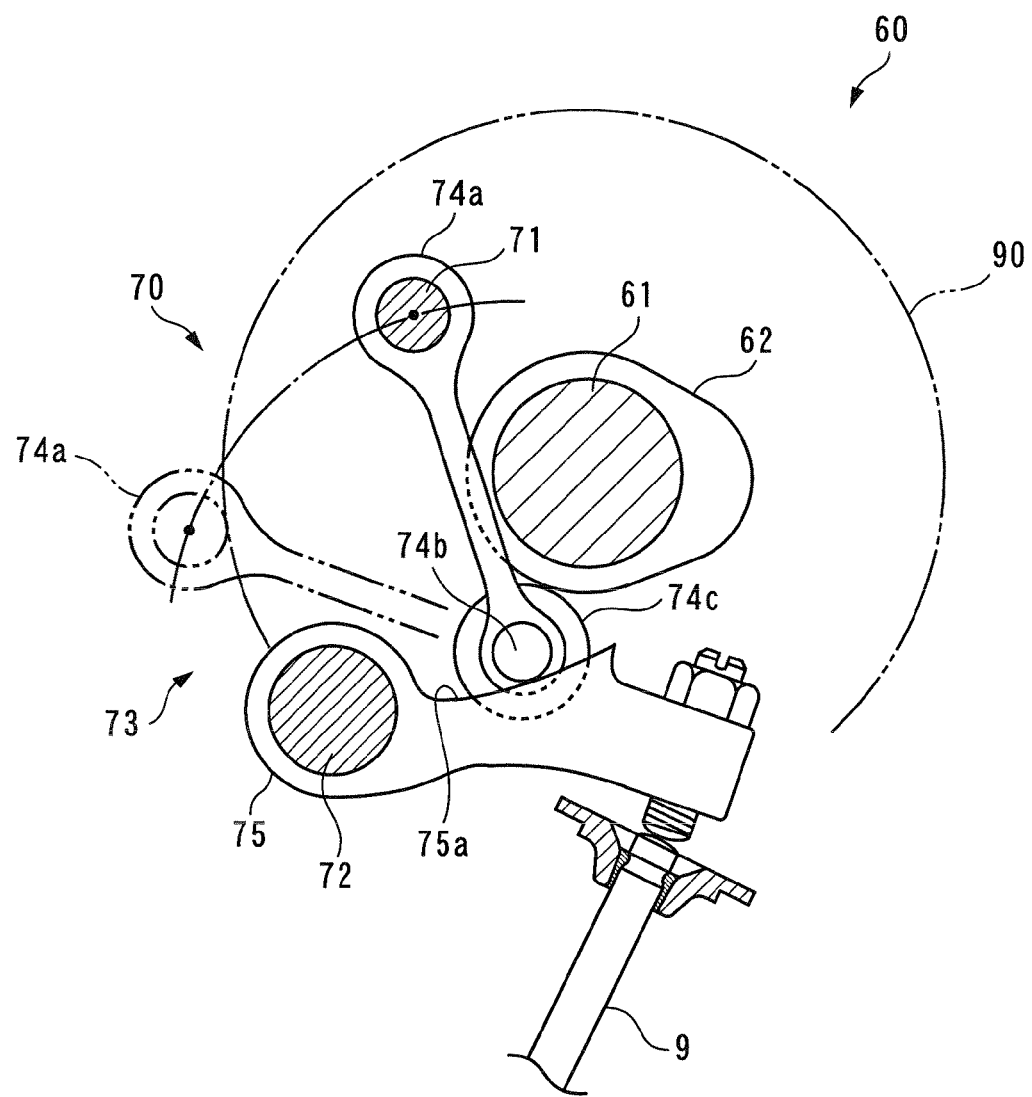
FIG. 4 A schematic view of an exhaust-side valve-operating mechanism.

As shown in FIG. 4, the exhaust-side valve-operating mechanism 60 is comprised of an exhaust cam shaft 61, an exhaust cam 62, a variable exhaust lift mechanism 70, and a variable exhaust cam phase mechanism 90.

The exhaust cam shaft 61 is connected to the crankshaft 3e via an exhaust sprocket and a timing chain (neither of which is shown), and rotates once whenever the crankshaft 3e rotates twice.

Figure 5:
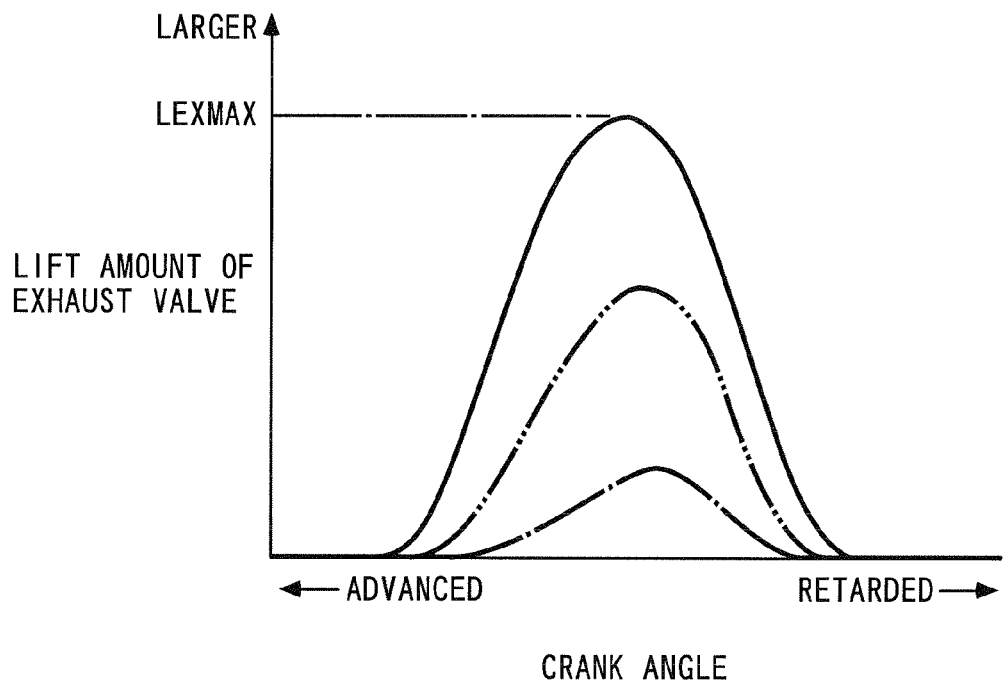
FIG. 5 A diagram showing changes in exhaust lift caused by a variable exhaust lift mechanism.
Figure 6:
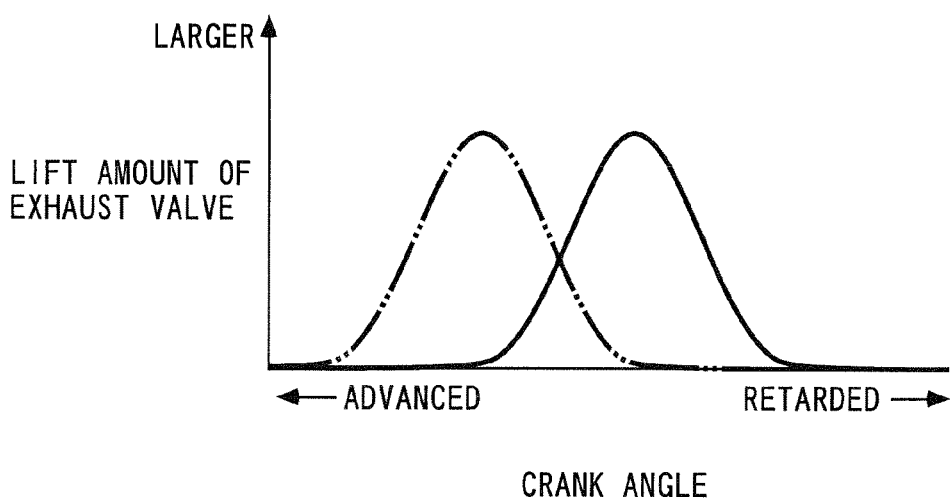
FIG. 6 A diagram showing valve lift curves of an exhaust valve assumed when an exhaust cam phase is set to the most retarded value (solid line) and the most advanced value (two-dot chain line), respectively, by a variable exhaust cam phase mechanism.

The variable exhaust lift mechanism 70 is configured to steplessly change the exhaust lift between a value of 0 and a predetermined maximum lift LEXMAX (see FIG. 5). The arrangement of the variable exhaust lift mechanism 70 is similar to that proposed in Japanese Laid-Open Patent Publication (Kokai) No. 2007-100522 by the present applicant, and hence hereinafter, a brief description will be given of the outline thereof.

The variable exhaust lift mechanism 70 is comprised of a control shaft 71, a rocker arm shaft 72, rocker arm mechanisms 73 which are provided on these shafts 71 and 72 for the respective cylinders 3a, an actuator 80 (see FIG. 2) which simultaneously drives these rocker arm mechanisms 73.

The rocker arm mechanisms 73 are each comprised of a link 74a, a roller shaft 74b, a roller 74c, and a rocker arm 75. Further, the actuator 80 is a combination of a motor and a reduction gear mechanism (neither of which is shown), and when the actuator 80 is driven by a lift control input U_SAAEX delivered from the ECU 2, referred to hereinafter, the control shaft 71 is rotated, whereby the link 74a is pivoted about the roller shaft 74b.

When the link 74a is at a zero lift position indicated by a solid line in FIG. 4, if the roller 74c is pushed toward the rocker arm shaft 72 by the exhaust cam 62 along with rotation of the exhaust cam shaft 61, the link 74a is clockwise pivoted about the control shaft 71 as viewed in FIG. 4. At this time, the rocker arm 75 is held at a valve-closing position shown in FIG. 4 by the urging force of a valve spring since a guide surface 75a of the rocker arm 75 has a shape which coincides with an arc about the control shaft 71. Therefore, the exhaust lift is held at a value 0, and the exhaust valve 9 is held in a valve-closed state.

On the other hand, in a state in which the link 74a is pivoted from the zero lift position to the maximum lift position (position indicated by a two dot-chain line in FIG. 4) and is held therein, if the link 74a is clockwise pivoted by rotation of the exhaust cam 62 about the control shaft 71 as viewed in FIG. 4, the rocker arm 75 is pivoted downward from the valve-closing position as viewed in FIG. 4, against the urging force of the valve spring to open the exhaust valve 9. At this time, the amount of pivotal motion, i.e. the exhaust lift of the rocker arm 75 becomes larger, as the link 74a is closer toward the maximum lift position.

With the above-described arrangement, as the link 74a is closer toward the maximum lift position, the exhaust valve 9 is opened with a larger lift. More specifically, during rotation of the exhaust cam 62, when the link 74a is at the maximum lift position, the exhaust valve 9 is opened along a valve lift curve indicated by a solid line illustrated in FIG. 5, and the exhaust lift thereof becomes equal to the maximum lift LEXMAX. Therefore, in this variable exhaust lift mechanism 70, by pivoting the link 74a between the zero lift position and the maximum lift position via the actuator 80, it is possible to steplessly vary the exhaust lift between the value of 0 and the predetermined maximum lift LEXMAX. Further, if an exhaust cam phase CAEX, referred to hereinafter, is the same, as the exhaust lift is larger, the valve-opening timing of the exhaust valve 9 becomes advanced, and the valve-closing timing thereof becomes retarded.

Figure 2:
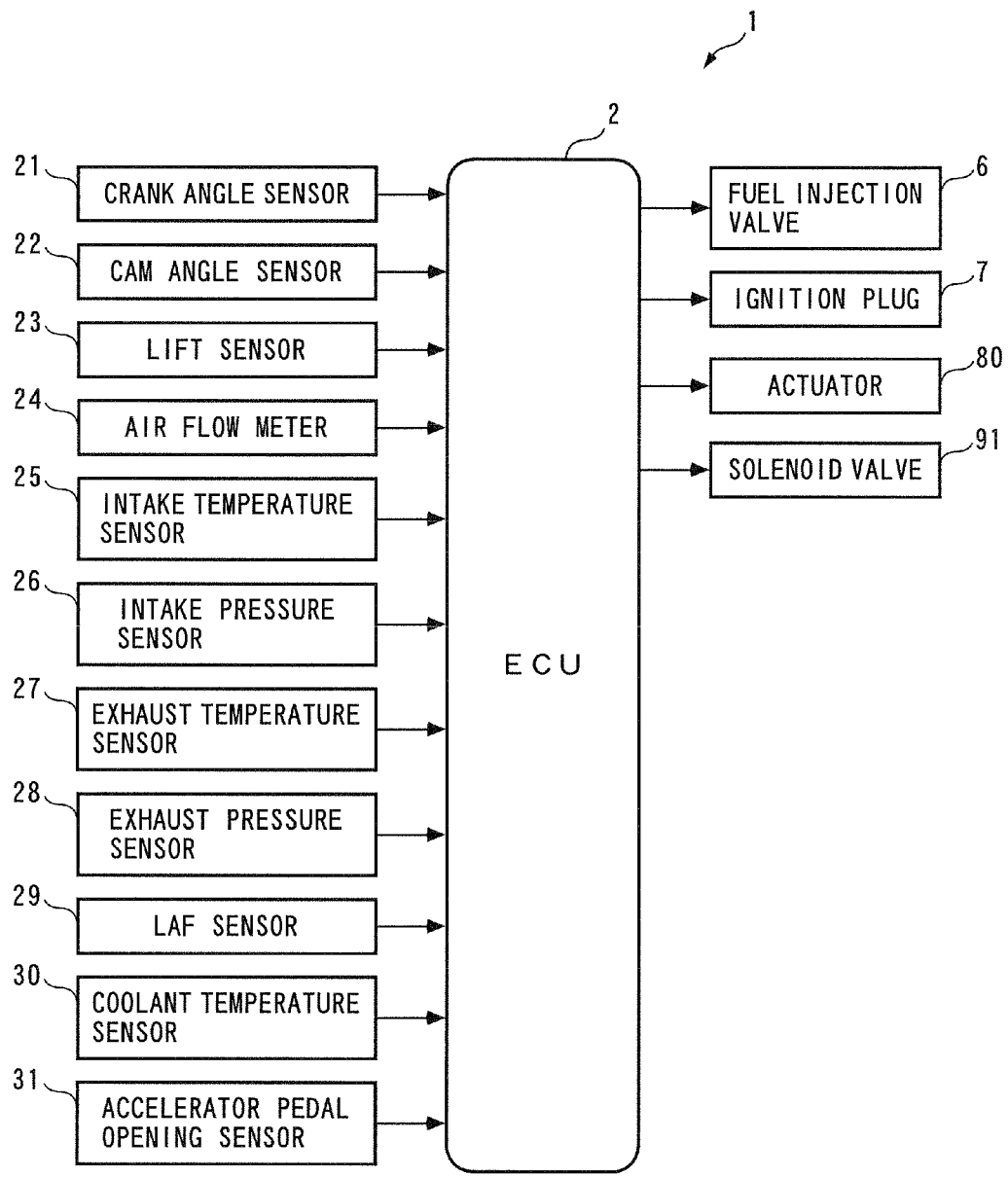
FIG. 2 A schematic view of part of the internal EGR control device.

Further, the variable exhaust lift mechanism 70 is provided with a lift sensor 23 for detecting the exhaust lift (see FIG. 2). The lift sensor 23 detects a pivotal angle SAAEX of the control shaft 71, and delivers a signal indicative of the sensed pivotal angle SAAEX to the ECU 2. The exhaust lift is uniquely determined from the pivotal angle SAAEX of the control shaft 71, and hence the detected pivotal angle SAAEX indicates an actual exhaust lift.

On the other hand, the variable exhaust cam phase mechanism 90 steplessly changes the phase CAEX of the exhaust cam shaft 61 with respect to the crankshaft 3e (hereinafter referred to as the "exhaust cam phase") to an advanced side or a retarded side. The arrangement of the variable exhaust cam phase mechanism 90 is similar to that proposed in Japanese Laid-Open Patent Publication (Kokai) No. 2005-315161 by the present applicant, and hence hereinafter, a brief description will be given of an outline thereof.

The variable exhaust cam phase mechanism 90 is disposed at an end of the exhaust cam shaft 61 toward an exhaust sprocket, and is comprised of a solenoid valve 91 (see FIG. 2), and an advancing chamber and a retarding chamber (neither of which is shown) into which oil pressure is supplied through the solenoid valve 91. The solenoid valve 91 is connected to the ECU 2, and continuously steplessly varies the exhaust cam phase CAEX between a predetermined most retarded value and a predetermined most advanced value, by varying oil pressure supplied to the advancing chamber and the retarding chamber according to a phase control input U_CAEX delivered from the ECU 2. This steplessly changes the valve timing of the exhaust valves 9 between the most retarded timing indicated by a solid line and the most advanced timing indicated by a two-dot chain line in FIG. 6.

On the other hand, a cam angle sensor 22 (see FIG. 2) is disposed at an end of the exhaust cam shaft 61 on a side thereof remote from the variable exhaust cam phase mechanism 90. The cam angle sensor 22 delivers an EXCAM signal, which is a pulse signal, to the ECU 2 along with rotation of the exhaust cam shaft 61 whenever the exhaust cam shaft 61 rotates through a predetermined cam angle (e.g. 1°). The ECU 2 calculates the exhaust cam phase CAEX based on the EXCAM signal and a CRK signal, referred to hereinafter.

As described above, in the engine 3, the lift and valve timing of the exhaust valves 9 are steplessly changed by the exhaust-side valve-operating mechanism 60, whereby the amount of burned gases caused to remain in each cylinder 3a, i.e. the internal EGR amount is controlled.

The engine 3 is provided with a crank angle sensor 21. The crank angle sensor 21 is formed by a magnet rotor and an MRE pickup (neither of which is shown), and delivers the CRK signal and a TDC signal, which are both pulse signals, to the ECU 2 along with rotation of the crankshaft 3e.

Each pulse of the CRK signal is generated whenever the crankshaft 3e rotates through a predetermined crank angle (e.g. 30°). The ECU 2 calculates rotational speed (hereinafter referred to as the "engine speed") NE of the engine 3 based on the CRK signal. Further, the TDC signal indicates that a piston 3b of each cylinder 3a is at a predetermined crank angle position in the vicinity of TDC (top dead center) at the start of the suction stroke thereof, and in the case of the four-cylinder engine of the present embodiment, a pulse thereof is delivered whenever the crankshaft rotates through 180 degrees.

Further, the intake pipe 4 of the engine 3 is provided with an air flow meter 24 (see FIG. 2), an intake temperature sensor 25, and an intake pressure sensor 26, from upstream to downstream in the mentioned order. The air flow meter 24 detects an intake air amount GAIR, the intake temperature sensor 25 detects temperature within the intake pipe 4 (hereinafter referred to as the "intake temperature") TIN, and the intake pressure sensor 26 detects pressure within the intake pipe 4 (hereinafter referred to as the "intake pressure") PIN, whereby signals indicative of respective detections are delivered to the ECU 2.

Further, the exhaust pipe 5 of the engine 3 is provided with an exhaust temperature sensor 27, an exhaust pressure sensor 28, and an LAF sensor 29 (see FIG. 2) at respective locations from upstream to downstream in the mentioned order. The exhaust temperature sensor 27 detects temperature within the exhaust pipe 5 (hereinafter referred to as the "exhaust temperature") TEX, the exhaust pressure sensor 28 detects pressure within the exhaust pipe 5 (hereinafter referred to as the "exhaust pressure") PEX, and signals indicative of respective detections are delivered to the ECU 2. The LAF sensor 29 linearly detects the concentration of oxygen in exhaust gases flowing through the exhaust pipe 5, in a broad air-fuel ratio range from a rich region richer than a stoichiometric air-fuel ratio to a very lean region, and delivers a signal indicative of the sensed oxygen concentration to the ECU 2. The ECU 2 calculates the air-fuel ratio of the exhaust gases, that is, the air-fuel ratio AF of the air-fuel mixture, based on the signal output from the LAF sensor 29.

The body of the engine 3 is provided with a coolant temperature sensor 30. The coolant temperature sensor 30 detects the temperature of engine coolant (hereinafter referred to as the "engine coolant temperature") TW circulating through a cylinder block 3f of the engine 3, and delivers a signal indicative of the sensed engine coolant temperature TW to the ECU 2.

Further, an accelerator pedal opening sensor 31 detects the stepped-on amount of an accelerator pedal, not shown, (hereinafter referred to as the "accelerator pedal opening") AP, and delivers a signal indicative of the sensed accelerator pedal opening AP to the ECU 2.

The ECU 2 is implemented by a microcomputer comprised of an I/O interface, a CPU, a RAM, and a ROM (none of which are specifically shown). The ECU 2 determines operating conditions of the engine 3 based on the detection signals from the aforementioned sensors 21 to 31, according to the control programs stored in the ROM, and sets the combustion mode of the engine 3 to either of the SI combustion mode and the CI combustion mode based on the determined operating conditions. Further, the ECU 2 carries out fuel injection control according to the determined operating conditions and the combustion mode of the engine 3.

Further, the ECU 2 controls the exhaust-side valve-operating mechanism 60 according to the determined combustion mode, thereby changing the valve-closing timing of the exhaust valves 9 to control the internal EGR amount. In the present embodiment, the ECU 2 corresponds to target internal EGR amount-setting means, internal energy-calculating means, target internal EGR amount-correcting means, valve-closing timing-calculating means, and controlling means.

Figure 7:
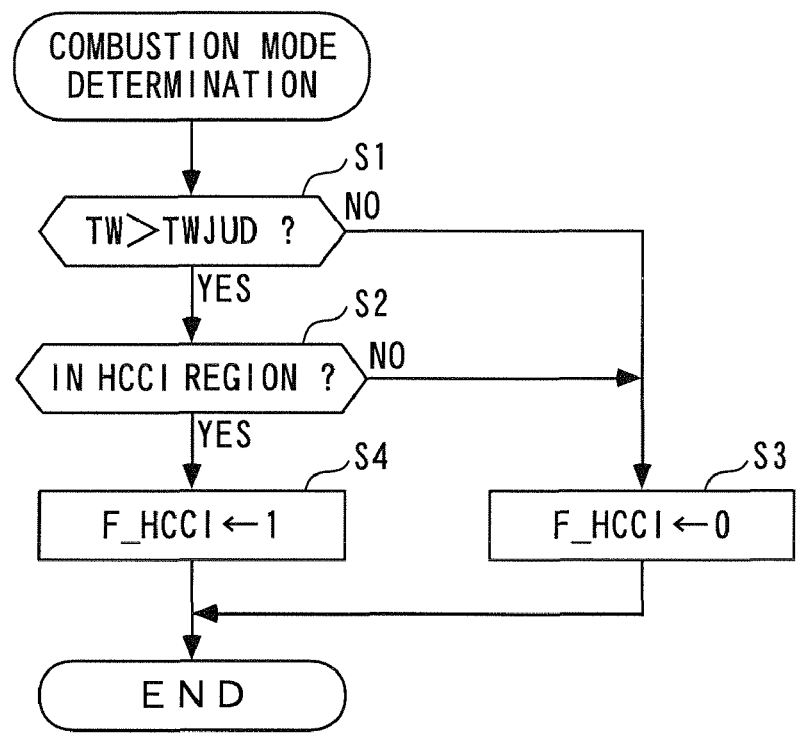
FIG. 7 A flowchart of a combustion mode determination process.

FIG. 7 is a flowchart of a combustion mode determination process which is executed by the ECU 2. The present process is carried out in synchronism with generation of each pulse of the TDC signal. In the present process, first, in a step 1 (shown as S1 in abbreviated form; the following steps are also shown in abbreviated form), it is determined whether or not the detected engine coolant temperature TW is higher than a predetermined temperature TWJUD (e.g. 85° C.). If the answer to the question is negative (NO), i.e. if the engine coolant temperature TW is not higher than the predetermined temperature TWJUD, it is judged that the temperature in the combustion chamber 3d cannot be ensured which is suitable for the CI combustion, and hence the combustion mode is determined to be set to the SI combustion mode. To indicate this fact, the CI combustion mode flag F_HCCI is set to 0 (step 3), followed by terminating the present process.

Figure 8:
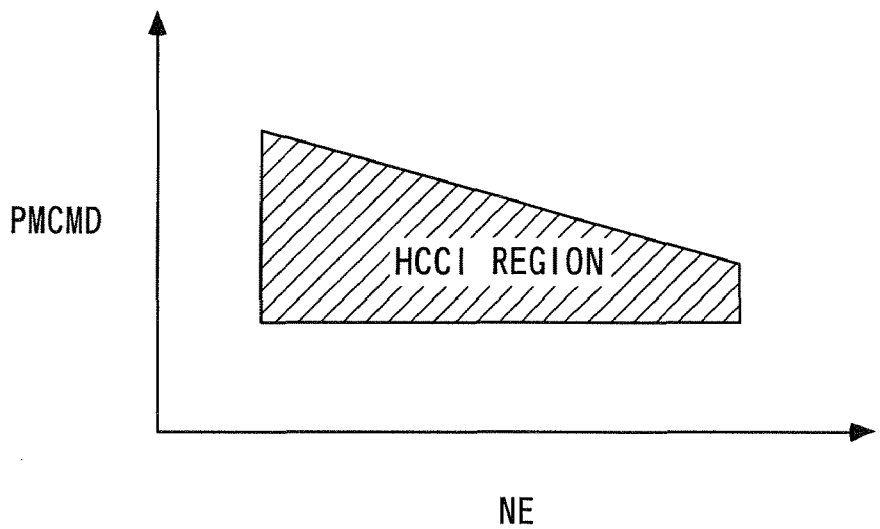
FIG. 8 An example of a combustion region map for use in the combustion mode determination process shown in FIG. 7.

On the other hand, if the answer to the question of the step 1 is affirmative (YES), it is determined whether or not the engine 3 is in a predetermined operating region (hereinafter referred to as the "HCCI region") for performing the CI combustion (step 2). This determination is performed according to the engine speed NE and the demanded torque PMCMD, based on a combustion region map shown in FIG. 8. In the combustion region map, the HCCI region corresponds to an operating region in which the engine speed NE is in a low to medium engine speed region, and the demanded torque PMCMD is in a low to medium load region. It should be noted that the demanded torque PMCMD is calculated by searching a map (not shown) according to the engine speed NE and the accelerator pedal opening AP.

If the answer to the question of the step 2 is negative (NO), i.e. if the engine 3 is not in the HCCI region, the process in the step 3 is carried out to select the SI combustion mode. On the other hand, if the answer to the question of the step 2 is affirmative (YES), i.e. if the engine 3 is in the HCCI region, the combustion mode is determined to be set to the CI combustion mode. To indicate this fact, the CI combustion mode flag F_HCCI is set to 1 (step 4), followed by terminating the present process.

Figure 9:
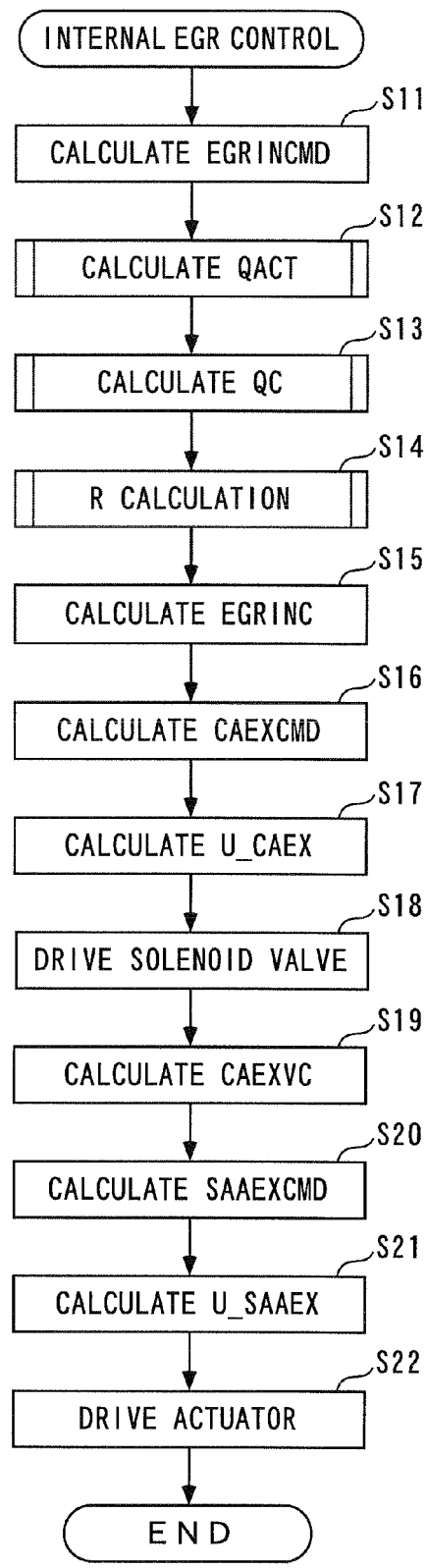
FIG. 9 A flowchart of an internal EGR control process.

FIG. 9 is a flowchart of an internal EGR control process. The present process is also carried out in synchronism with generation of each pulse of the TDC signal. In the present process, first, in a step 11, a target internal EGR amount EGRINCMD as a target to which the internal EGR amount is to be controlled is calculated according to the engine speed NE and the demanded torque PMCMD by searching a predetermined map (not shown) set on a combustion mode-by-combustion mode-basis.

Figure 10:
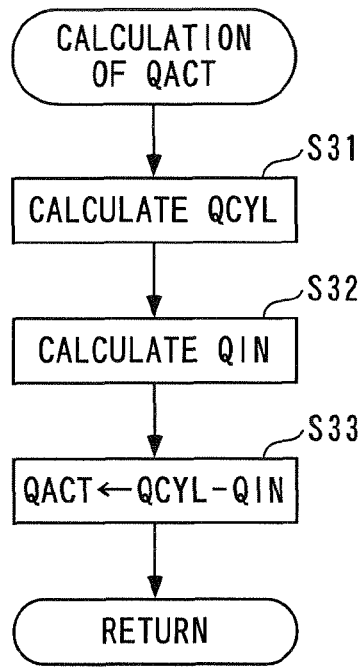
FIG. 10 A subroutine of a process for calculating actual internal energy.

Next, internal energy possessed by burned gases remaining within the cylinder 3a (hereinafter referred to as "the actual internal energy") QACT is calculated (step 12). FIG. 10 is a subroutine of a process for calculating the actual internal energy QACT. First, in a step 31, the internal energy of an operating gas formed by combination of intake air and burned gases existing within the cylinder 3a immediately before the start of the compression stroke (hereinafter referred to as "the operating gas internal energy") QCYL is calculated according to the intake pressure PIN, by the following equation (1):

$$QCYL = PIN \times VCYL/R1 \quad (1)$$

In this equation, R1 represents a gas constant (e.g. 287 J/kg·K). VCYL represents a volume of the cylinder 3a immediately before the start of the compression stroke, and is set to a predetermined value. Further, the reason for calculating the operating gas internal energy QCYL by the above equation (1) is that the internal energy possessed by a gas is determined by the product of a mass and temperature of the gas, and from the equation of state of gas (PV=nRT), the right side of the equation (1) corresponds to the product of the mass and temperature of the gas.

Next, using the detected intake air amount GAIR and intake air temperature TIN, the internal energy of the intake air (hereinafter referred to as "the intake air internal energy") QIN is calculated by the following equation (2) (step 32):

$$QIN = GAIR \times TA \quad (2)$$

Next, by subtracting the intake air internal energy QIN from the operating gas internal energy QCYL (=QCYL−QIN), the actual internal energy QACT is calculated (step 33), followed by terminating the present process. From the law of conservation of energy, assuming that the intake air and the burned gases have the same specific heat, the operating gas internal energy QCYL is equal to the sum of the actual internal energy QACT and the intake air internal energy QIN (QCYL=QACT+QIN). Therefore, as described above, the actual internal energy QACT can be calculated from the operating gas internal energy QCYL and the intake air internal energy QIN, as the difference therebetween.

Figure 11:
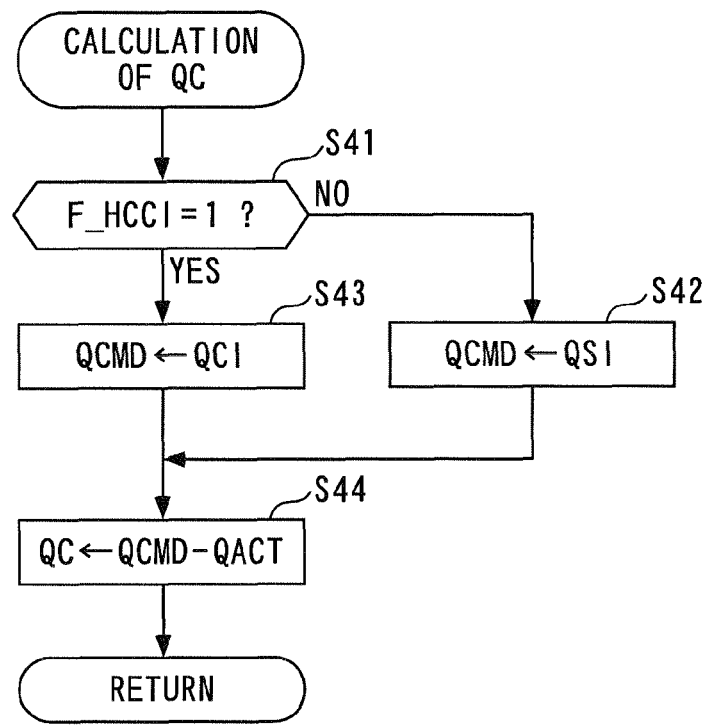
FIG. 11 A subroutine of a process for calculating a correction value.
Figure 12:
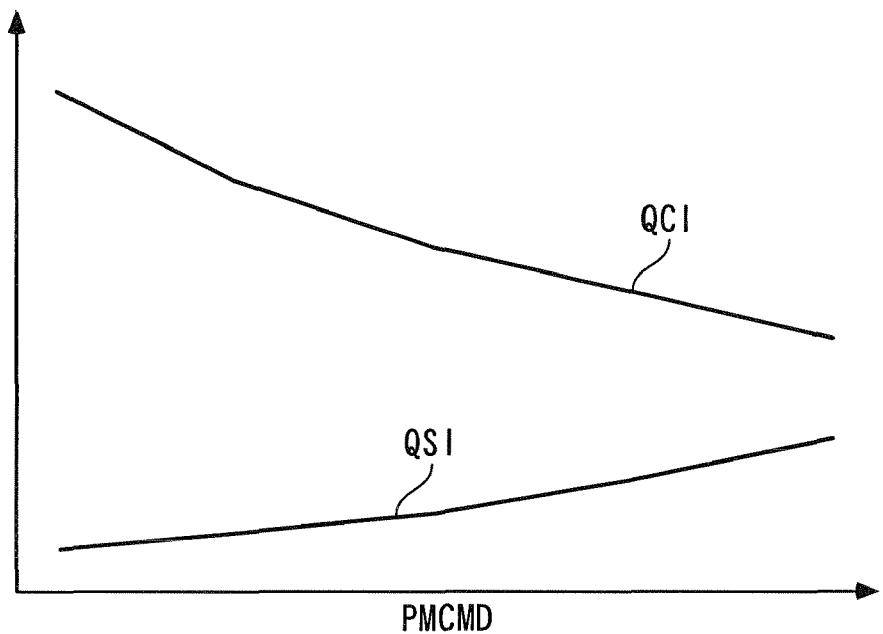
FIG. 12 A map for calculating target internal energy for a SI combustion mode and a CI combustion mode, for use in the process shown in FIG. 11.

Referring back to FIG. 9, in a step 13 following the step 12, a correction value QC dependent on the actual internal energy QACT is calculated. FIG. 11 is a subroutine of a process for calculating the correction value QC. In the present process, first in a step 41, it is determined whether or not a CI combustion mode flag F_HCCI is equal to 1. If the answer to this question is negative (NO), which means that the engine is in the SI combustion mode, a map shown in FIG. 12 is searched according to the demanded torque PMCMD to determine a map value QSI for the SI combustion mode, whereby the map value QSI is set as target internal energy QCMD which is a target of the internal energy (step 42). In this map, the map value QSI is set to a larger value as the demanded torque PMCMD is larger.

On the other hand, if the answer to the question of the step 41 is affirmative (YES), which means that the engine is in the CI combustion mode, the map shown in FIG. 12 is searched according to the demanded torque PMCMD to determine a map value QCI for the CI combustion mode, whereby the map value QCI is set as the target internal energy QCMD (step 43). In this map, the map value QCI is set to a larger value as the demanded torque PMCMD is smaller since larger internal energy is required for self-ignition as the demanded torque PMCMD is smaller. Further, to secure internal energy necessary for self-ignition, the map value QCI for the CI combustion mode is set to a larger value than the map value QSI for the SI combustion mode in a whole region of the demanded torque PMCMD.

In a step 44 following the step 42 or the step 43, by subtracting the actual internal energy QACT from the target internal energy QCMD (=QCMD−QACT), the correction value QC is calculated, followed by terminating the present process.

Figure 13:
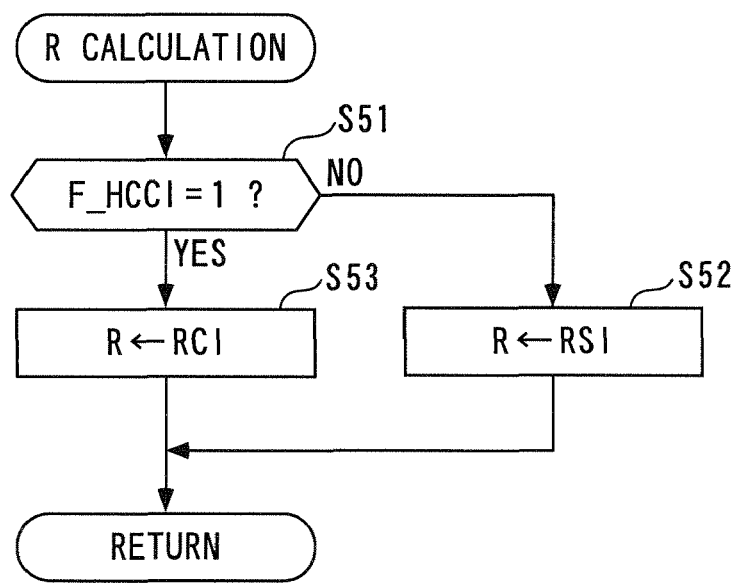
FIG. 13 A subroutine of a process for calculating a gas constant.

Referring again to FIG. 9, in a step 14 following the step 13, a gas constant R is calculated. FIG. 13 is a subroutine of a process for calculating the gas constant R. In the present process, first, in a step 51, it is determined whether or not the CI combustion mode flag F_HCCI is equal to 1. If the answer to the question is negative (NO), i.e. if the SI combustion mode has been selected, the gas constant R is set to a predetermined value RSI (e.g. 255 J/kg·K) (step 52), followed by terminating the present process. The predetermined value RSI corresponds to a gas constant of burned gases in homogeneous combustion, and is empirically obtained e.g. by experiment in advance.

On the other hand, if the answer to the question of the step 51 is affirmative (YES), i.e. the CI combustion mode has been selected, a map value RCI is retrieved from a predetermined map (not shown) according to the detected air-fuel ration AF, and is set as the gas constant R (step 53), followed by terminating the present process. In the above-mentioned map, the map value RCI is set between an upper limit value (e.g. 287 J/kg·K) corresponding to a gas constant of air and a lower limit value (e.g. 255 J/kg·K) corresponding to the gas constant of burned gas in homogeneous combustion, such that the map value RCI is set to a larger value as the air-fuel ratio AF is higher.

Returning again to FIG. 9, in a step 15 following the step 14, using the correction value QC, the target internal EGR amount EGRINCMD, the detected exhaust temperature TEX and exhaust pressure PEX, and the calculated gas constant R, a final target internal EGR amount EGRINC is calculated based on the gas state equation by the following equation (3):

$$EGRINC = (EGRINCMD \times TEX + QC) \times R/PEX \quad (3)$$

Next, a target exhaust cam phase CAEXCMD which serves as a target to which the exhaust cam phase CAEX is controlled is calculated by searching a map (not shown) according to the calculated final target internal EGR amount EGRINC and the engine speed NE (step 16). Then, the phase control input U_CAEX is calculated according to the calculated target exhaust cam phase CAEXCMD and the detected actual exhaust cam phase CAEX (step 17), and the solenoid valve 91 is driven according to the calculated phase control input U_CAEX (step 18). Thus the exhaust cam phase CAEX is controlled to the target exhaust cam phase CAEXCMD.

Next, a target valve-closing crank angle CAEXVC corresponding to the target valve-closing timing of the exhaust valves 9 is calculated by searching a table (now shown) according to the final target internal EGR amount EGRINC (step 19), and a target pivotal angle SAAEXCMD which serves as a target to which a pivotal angle SAAEX of the control shaft 71 is controlled is calculated according to the target valve-closing crank angle CAEXVC and the exhaust cam phase CAEX (step 20).

Then, the lift control input U_SAAEX is calculated according to the pivotal angle SAAEX and the target pivotal angle SAAEXCMD (step 21). Then, the actuator 80 is driven according to the lift control input U_SAAEX (step 22). Thus the pivotal angle SAAEX is controlled to the target pivotal angle SAAEXCMD.

As described above, according to the present embodiment, the target internal EGR amount EGRINCMD is corrected according to the actual internal energy QACT calculated based on the difference between the operating gas internal energy QCYL and the intake air internal energy QIN (=QCYL−QIN). Therefore, even when aging or the like has caused a change in the actual valve timing of the exhaust valves 9, thereby causing a change in the state and properties of burned gases, it is possible to properly calculate the final target internal EGR amount EGRINC while compensating for an adverse influence caused by the change. Further, the correction value QC for correcting the target internal EGR amount EGRINCMD is set as the difference between the target internal energy QCMD and the actual internal energy QACT. This makes it possible to secure internal energy necessary for combustion. Further, the exhaust-side valve-operating mechanism 60 is controlled according to the final target internal EGR amount EGRINC calculated as above, to thereby control the valve-closing timing of the exhaust valve 9, which makes it possible to properly control the internal EGR amount, with the result that the temperature within the cylinder 3a can be properly controlled.

Furthermore, the actual internal energy QACT is calculated using the operating gas internal energy QCYL and the intake air internal energy QIN. Therefore, without newly providing a sensor for detecting the mass and temperature of burned gases, it is possible to properly calculate the actual internal energy QACT using the existing sensors 24 to 26 which are usually provided for control of the engine 3, without involving an increase in cost.

It should be noted that the present invention is by no means limited to the embodiment described above, but it can be practiced in various forms. For example, although in the present embodiment, the actual internal energy QACT is calculated based on the difference between the operating gas internal energy QCYL and the intake internal energy QIN, this is not limitative, but any other suitable calculation method may be employed insofar as it can properly calculate the actual internal energy. For example, the amount and temperature of burned gases may be acquired, and the actual internal energy QACT may be calculated based on the product of the both. Further, although in the above-described embodiment, the internal EGR amount is controlled by both of the variable exhaust lift mechanism 70 and the variable exhaust cam phase mechanism 90, this is not limitative, but for example, the internal EGR amount may be controlled by one of them.

Furthermore, although in the above-described embodiment, the present invention is applied to the gasoline engine installed on a vehicle, this is not limitative, but it can be applied to various engines other than the gasoline engine, e.g. a diesel engine, and further, it can be applied to engines other than the engines for a vehicle, e.g. engines for ship propulsion machines, such as an outboard motor having a vertically-disposed crankshaft. Further, it is possible to change details of the construction of the embodiment within the spirit and scope of the present invention.

INDUSTRIAL APPLICABILITY

As described above, the control system for an internal combustion according to the present invention can be applied to various kinds of internal combustion engines, as the internal EGR control device for an internal combustion engine, which, even when aging or the like has caused a change in the actual valve timing of the exhaust valves, is capable of properly controlling the internal EGR amount while compensating for an adverse influence caused by the change, thereby properly controlling the temperature within the cylinder.

The invention claimed is:

1. An internal EGR control device for an internal combustion engine for controlling internal EGR which causes burned gases to remain in a cylinder, comprising:
   a variable valve mechanism that controls an internal EGR amount by changing a valve-closing timing of an exhaust valve of the engine;
   operating condition-detecting means for detecting operating conditions of the engine;
   target internal EGR amount-setting means for setting a target internal EGR amount which serves as a target to which the internal EGR amount is controlled, according to the detected operating conditions of the engine;
   operating gas internal energy-calculating means for calculating internal energy of an operating gas existing within the cylinder immediately before a start of a compression stroke of the engine;
   intake air internal energy-calculating means for calculating internal energy of intake air drawn into the cylinder;
   burned gas internal energy-calculating means for calculating burned gas internal energy possessed by burned gases by subtracting the calculated internal energy of the intake air from the calculated internal energy of the operating gas;
   target internal EGR amount-correcting means for correcting the target internal EGR amount according to the calculated internal energy;
   valve-closing timing-calculating means for calculating the valve-closing timing of the exhaust valve according to the corrected target internal EGR amount; and
   control means for controlling said variable valve mechanism based on the calculated valve-closing timing of the exhaust valve.

2. An internal EGR control device as claimed in claim 1, wherein said variable valve mechanism comprises:
   a variable lift mechanism for changing a lift of the exhaust valve; and
   a variable cam phase mechanism for changing an exhaust cam phase which is a phase with respect to a crank shaft of an exhaust cam which drives the exhaust valve.

* * * * *